United States Patent [19]

Kroll

[11] Patent Number: 4,713,725
[45] Date of Patent: Dec. 15, 1987

[54] DEFENSIVE SYSTEM FOR USE AGAINST HOSTILE ELEMENTS

[76] Inventor: Menahem Kroll, Doar Na Ma'ale Hagalil, Mizpeh Abirim, Israel

[21] Appl. No.: 890,909

[22] Filed: Jul. 28, 1986

[30] Foreign Application Priority Data

Mar. 25, 1986 [IL] Israel .................................... 78252

[51] Int. Cl.$^4$ ............................................. H02H 5/12
[52] U.S. Cl. ............................................ 361/232
[58] Field of Search .............. 361/232; 43/17.1, 98, 43/99, 112; 128/376, 377, 379; 256/10; 367/139

[56] References Cited

U.S. PATENT DOCUMENTS

| | | | |
|---|---|---|---|
| 1,915,721 | 6/1933 | Diaz | 361/232 |
| 2,164,076 | 6/1939 | Osgood | 361/232 X |
| 3,197,916 | 8/1965 | Cole, Jr. et al. | 43/98 |
| 4,494,733 | 1/1985 | Olsson | 256/10 |

Primary Examiner—L. T. Hix
Assistant Examiner—Brian W. Brown
Attorney, Agent, or Firm—Burgess, Ryan & Wayne

[57] ABSTRACT

A defensive system for use against hostile elements for example in motor vehicles or aircraft comprising a cloth fabric having secured thereto first and second main, electrical conductors, first and second sets of flexible, substantially uninsulated branch electrical conductors secured to the fabric and respectively electrically connected to and transversely directed with respect to the main conductors and spaced apart along the lengths thereof with the first branch conductors interleaved with respect to the second branch conductors and spaced therefrom, a pulsed electric power supply and switch control means for coupling opposite poles of the supply to the main conductors so as to create between adjacent first and second branch conductors a high, intermittent potential difference designed to be short-circuited upon contact by a hostile element.

3 Claims, 4 Drawing Figures

DEFENSIVE SYSTEM FOR USE AGAINST HOSTILE ELEMENTS

This invention relates to a defensive system for use against hostile elements. The invention is particularly concerned with a defensive system designed to afford protection to a person equipped therewith against attack or, alternatively, to provide protection against unauthorised intrusion.

According to the present invention there is provided a defensive system for use against hostile elements comprising a cloth fabric having secured thereto first and second main electrical conductors, first and second sets of flexible, substantially uninsulated branch electrical conductors transversely directed with respect to said main conductors and spaced apart along the length thereof with said first branch conductors interleaved with respect to said second branch conductors and spaced therefrom, said first and second sets of branch conductors being respectively electrically connected to said main conductors, a pulsed electric power supply and switch control means for coupling opposite poles of said power supply to said main conductors so as to create between adjacent said first and second branch conductors a high, intermittent potential difference designed to be short-circuited upon contact by a hostile element.

Preferably, the defensive system is designed for use in motor vehicles so as to afford protection to a driver against attack by a passenger. In such a system, car seat covers are formed of the fabric and are used to cover the seats such as the front seat adjoining the driver's seat and the rear car seats which can be occupied by a potential attacker or attackers. Additionally, if desired, the rear surface of the driver's car seat can be formed of such fabric.

The switch control means of the system is placed within easy access of the driver, preferably the driver's foot, and when the latter fears that he is about to be attacked he actuates the switch control means thereby coupling the main conductors associated with each car seat cover to the pulsed electric power supply. The attacker who is sitting or is otherwise in bodily contact with the car seat cover immediately receives a series of high voltage shocks of very short duration which are capable of incapacitating the attacker without endangering his life or causing him any lasting injury. The attacker or attackers are thus incapacitated for a sufficient period of time for the driver to stop the vehicle, escape, summon assistance or prepare to defend himself in some other manner.

Alternatively, the cloth fabric can be used as a defensive curtain so as to discourage unauthorised intrusion into a home or the like. The fabric can, if desired, form part of protective clothing.

For a better understanding of the present invention and to show how the same may be carried out in practice, reference will now be made to the accompanying drawings in which FIG. 1 is a schematic representation of a cloth fabric for use in a defensive system in accordance with the present invention;

Figure 1:
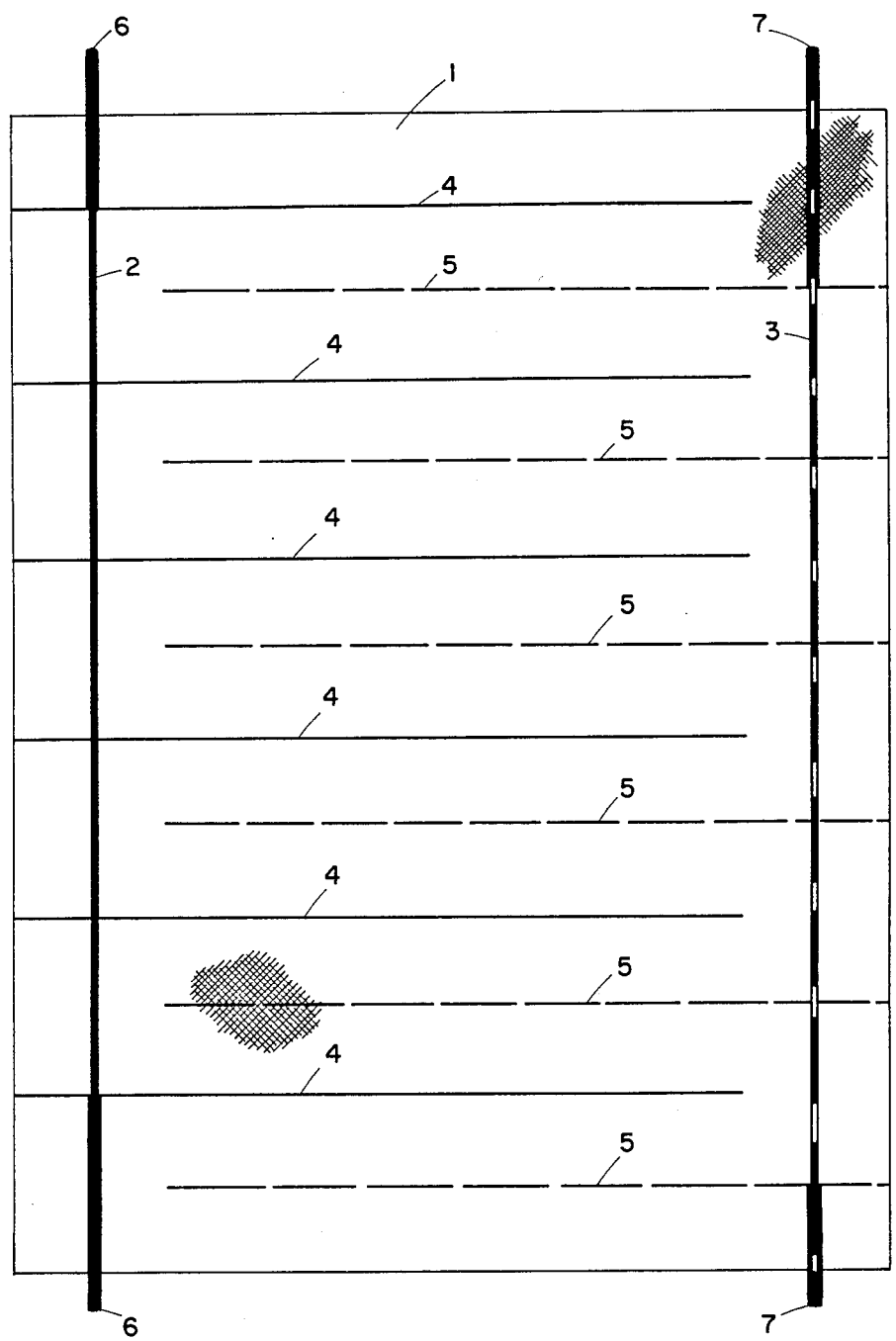

As seen in FIG. 1 of the drawings, a length of cloth fabric 1 is provided, on its underside, with an electrical conductor system comprising a pair of longitudinally extending main electrical conductors 2 and 3, there extending transversely from and electrically connected to the electrical conductor 2, spaced apart branch conductors 4, whilst there extends transversely from the conductor 3 whilst being electrically conducted thereto branch conductors 5. The branch conductors 4 are interleaved with respect to the branch conductors 5 and are respectively spaced apart.

Whilst the main conductors 2 and 3 and the branch conductors 4 and 5 are essentially uninsulated, the main conductors 2 and 3 are provided with respectively insulated coupling terminals 6 and 7.

The main conductors 2 and 3 and the branch conductors 4 and 5, which are highly flexible, are secured to the underside of the fabric (preferably without being visible from the upper side) in any suitable way such as, for example, by being woven into the fabric.

Figure 2:
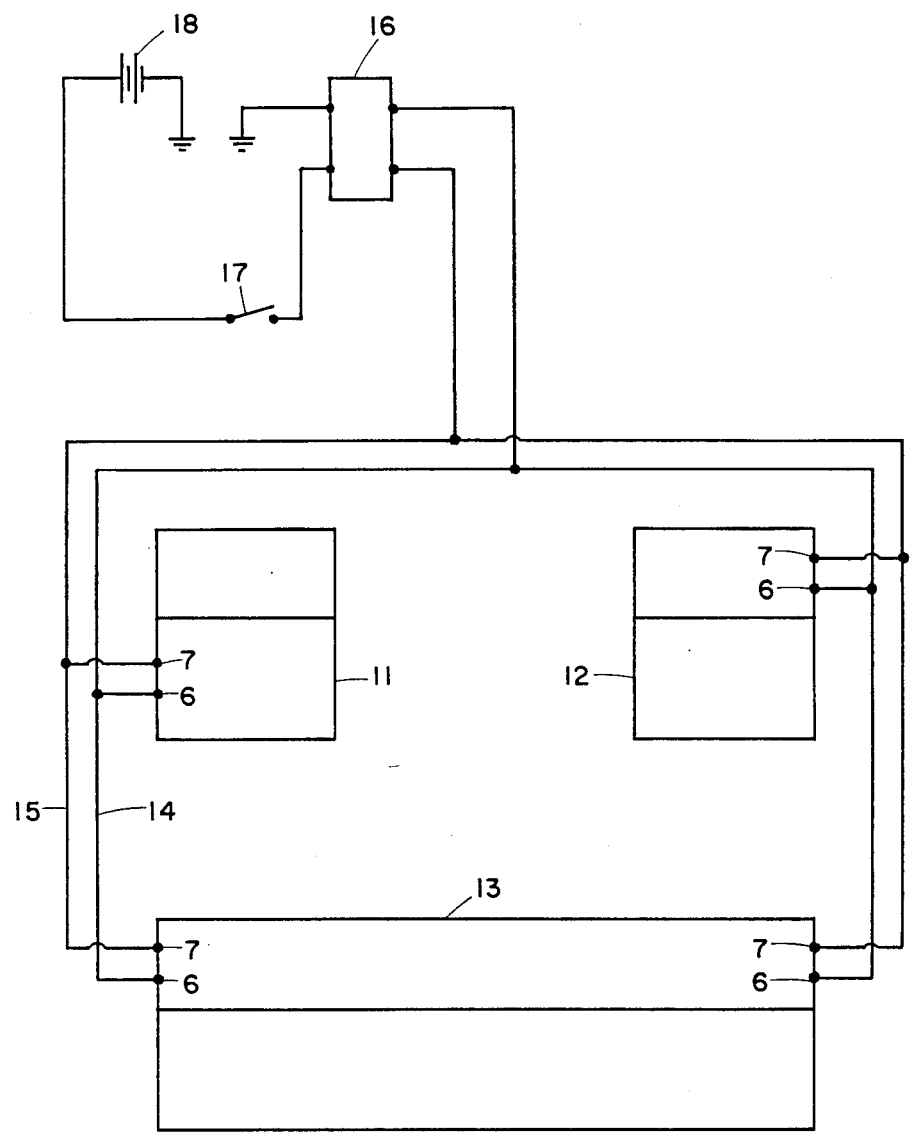
FIG. 2 is a schematic circuit diagram showing how the electric conductors of car seat covers formed of such cloth fabrics are incorporated in an electric circuit of the defensive system.

Reference will now be made to FIG. 2 of the drawings for a schematic illustration of a defensive system incorporating a cloth fabric of the kind illustrated in FIG. 1 of the drawings. This defensive system is for use in a car vehicle having a driver's seat 11, a front passenger seat 12 and a rear passenger seat 13. The seats 11, 12 and 13 are provided with seat covers which, in the case of the seats 12 and 13 are entirely formed of fabric illustrated in FIG. 1. In the case of the driver's seat 11, only the rear portion (i.e. the portion not contacted by the driver) is formed of such fabric. All the car seat covers are respectively provided with one or more sets of terminals 6, 7, which are respectively connected via conductors 14 and 15 to a pulsed electrical power supply 16 which is in turn connected, via a switch control means 17, to the motor vehicle power supply 18.

Figure 3:
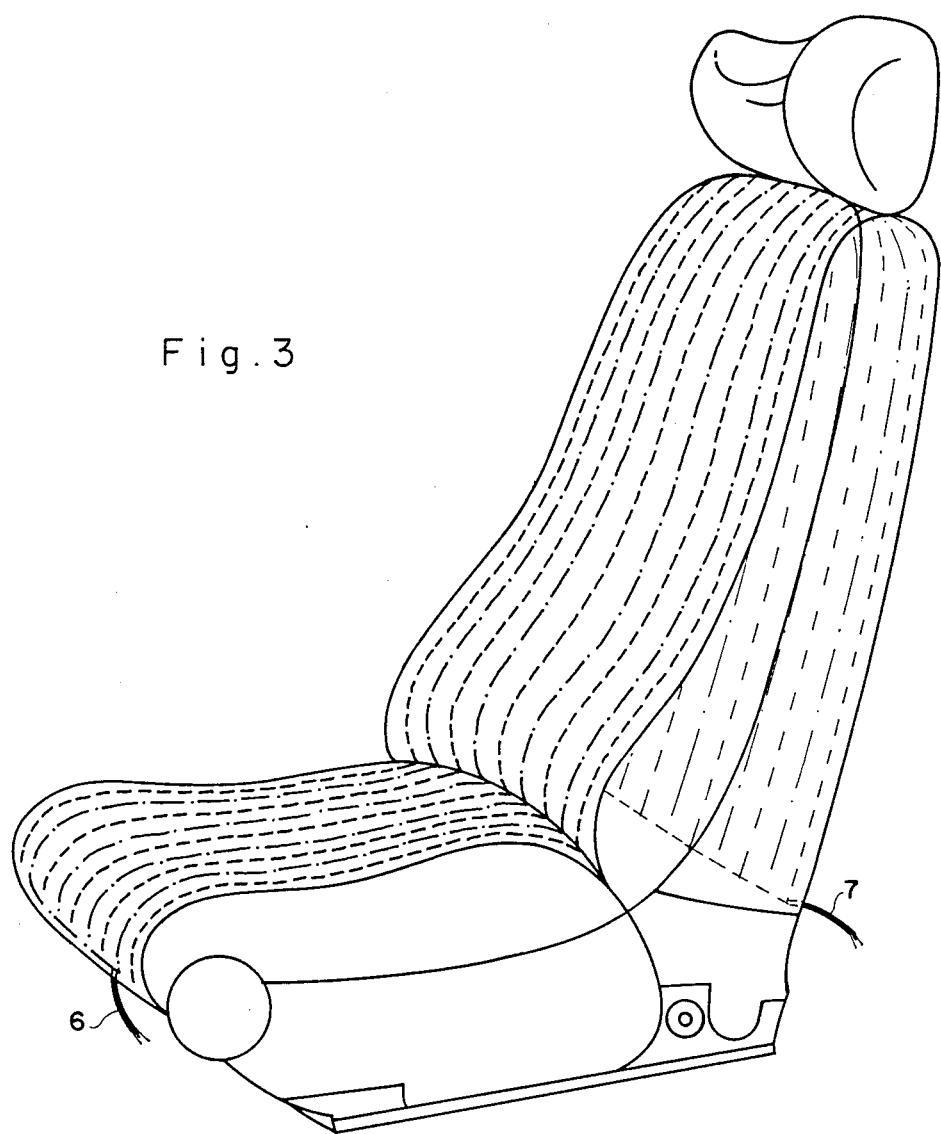
FIG. 3 shows a front passenger seat of a motor vehicle provided with a car seat cover incorporating a cloth fabric in accordance with the invention.
Figure 4:
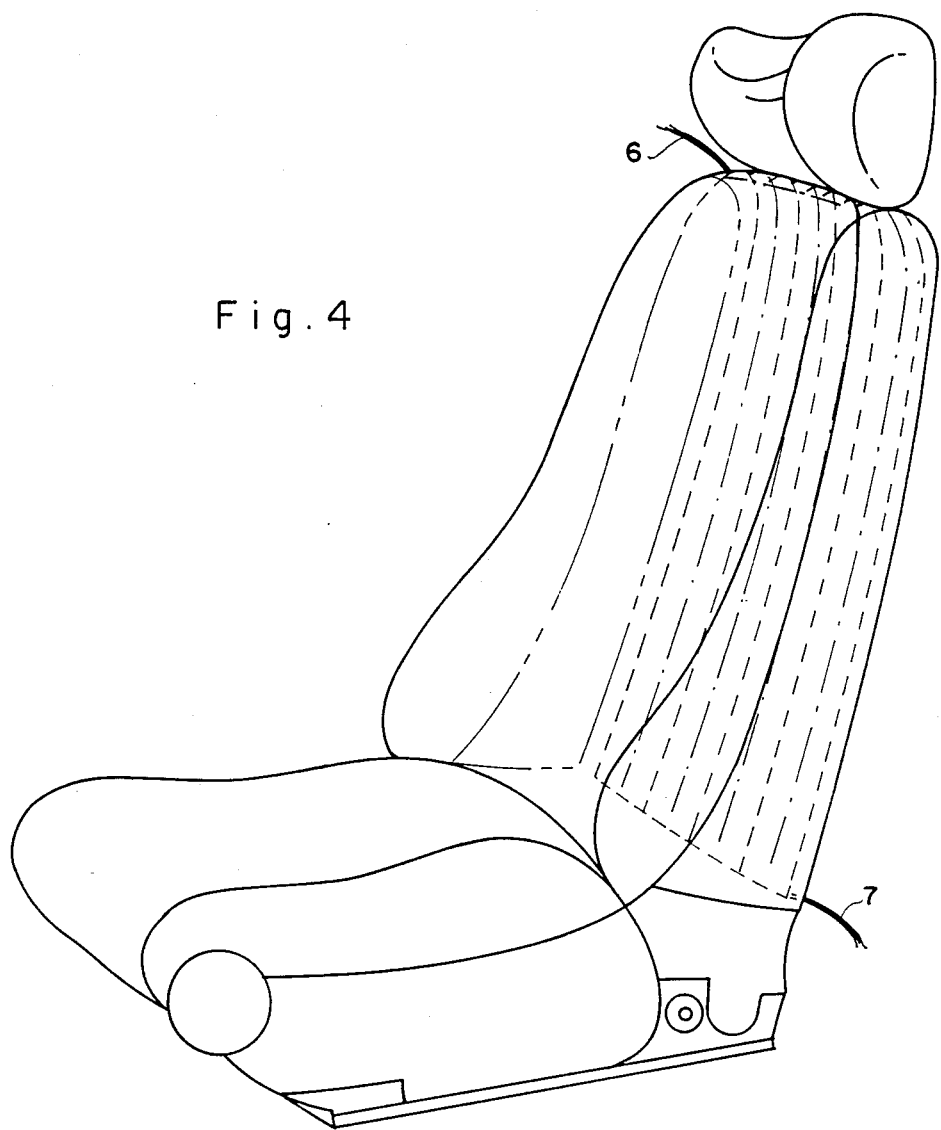
FIG. 4 shows a driver's seat incorporating a car seat cover forming part of a defensive system in accordance with the present invention.

FIG. 3 shows pictorially how the protective seat cover is fitted on the front passenger seat, whilst FIG. 4 shows pictorially the seat cover of the driver's seat where the rear portion of the seat cover and the upper edge thereof is provided with the protective electric conductors.

The mode of operation of the defensive system as incorporated in a motor vehicle and as illustrated schematically in the preceding drawings, will now be described.

Once the driver of the motor vehicle has reason to suspect that he is about to be attacked by one or more passengers sitting or otherwise in bodily contact with the front and rear passenger seats and/or the rear portion of the driver's seat, the driver actuates with his foot the switching means 17, as a result of which the conductor system of the seat covers is placed in circuit with the electrically pulsed supply 16. The potential attacker or attackers in bodily contact with the car seat covers receive(s) massive intermittent electric shocks which are effective totally to incapacitate the attacker(s), whereupon the driver can stop the vehicle so as either to escape or so as to prepare his defence or so as to summon assistance. The electrically pulsed supply is of such a nature as to generate intermittent, high potential differences between the branch conductors which are sufficient to give high voltage shocks of very small duration to the potential attacker(s) which are sufficient to incapacitate the attacker(s) without endangering his life or causing him permanent injury.

In order to insure that the defensive system is not accidentally actuated, the switching means 17 can be incorporated in a protective casing so that its actuation requires breaking open of the casing and its subsequent replacement.

In an alternative embodiment, the car body can be connected in circuit so that upon actuation of the switching means by the driver the intermittent voltage pulses are applied between the car body and earth so as to be short-circuited by anyone touching the car body from the outside, e.g. for the purpose of attacking the driver.

Whilst the invention has been particularly described as applied to fabrics which form protective car seat covers, the invention also extends to a system wherein a set of main and branch conductors, instead of being secured to a separate fabric, are applied directly to the car seat upholstery to be covered by a normal outer seat surface.

Whilst the invention has been particularly described with reference to a defensive system for use in motor vehicles, it will be readily appreciated that the cloth fabric, which in this case has been designed for use in forming protective car seat covers, can be used for forming protective clothing or, for example, alternatively for forming curtains or the like which can serve to protect a house against unauthorised entry. The invention is equally applicable for use in carpets such as for example carpets used in aircraft for protection against highjackers.

I claim:

1. A defensive system for use against hostile elements in a motor vehicle, comprising:
   at least one seat cover of the motor vehicle formed of a cloth fabric having secured thereto first and second main electrical conductors, first and second sets of flexible, substantially uninsulated branch electrical conductors secured to said fabric and respectively electrically connected to and traversely directed with respect to said main conductors and spaced apart along the lengths thereof with said first branch conductors interleaved with respect to said second branch conductors and spaced therefrom,
   a pulsed electric power supply, and
   switch control means operable by a driver of the motor vehicle for coupling opposite poles of said power supply to said main conductors of the fabric of each said car seat cover so as to create between adjecent first and second branch conductors a high, intermittent potential difference designed to be short-circuited upon contact by a hostile element.

2. A defensive system acording to clim 1 wherein said branch conductors are secured to an underside of the fabric forming said seat covers.

3. A defensive system according to claim 1 wherein said branch conductors are interwoven with said fabric.

* * * * *